(No Model.)
K. MEZGER.
APPARATUS FOR OBTAINING INFUSIONS OF COFFEE, TEA, &c.
No. 559,339. Patented Apr. 28, 1896.
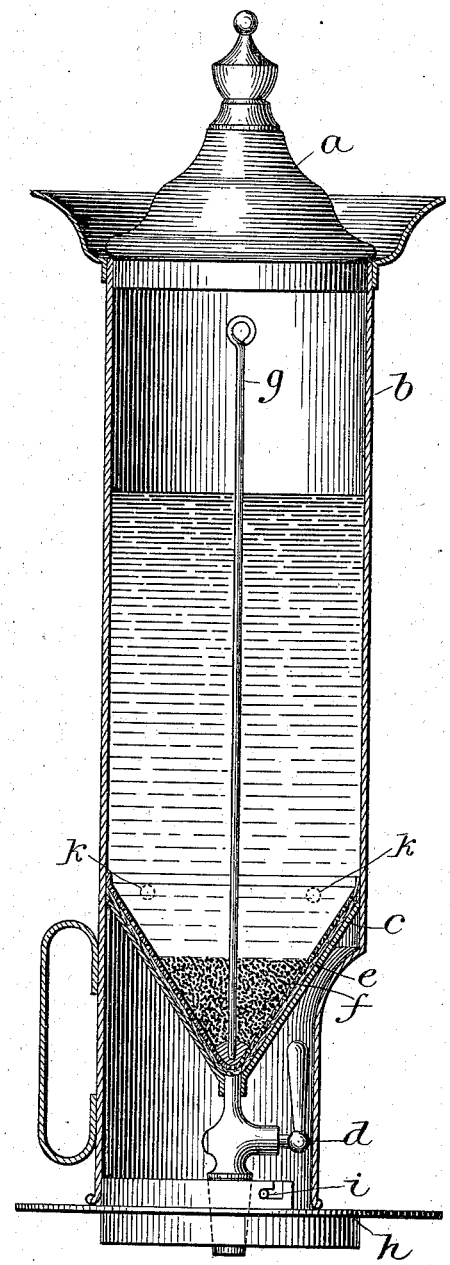
Witnesses:
Inventor.

United States Patent Office.

KARL MEZGER, OF FRANKFORT-ON-THE-MAIN, GERMANY.

APPARATUS FOR OBTAINING INFUSIONS OF COFFEE, TEA, &c.

SPECIFICATION forming part of Letters Patent No. 559,339, dated April 28, 1896.

Application filed December 22, 1894. Serial No. 532,732. (No model.)

*To all whom it may concern:*

Be it known that I, KARL MEZGER, of Frankfort-on-the-Main, in the Province of Hesse-Nassau, Kingdom of Prussia, Germany, have invented new and useful Improvements in Apparatus for Obtaining Infusions of Coffee, Tea, or the Like, of which the following is a specification.

The subject of the following invention is an apparatus constructed of white-metal or of some other suitable material, of a comparatively narrow or lofty cylindrical shape, fitted at the top with a tight cover and at the lower part with a proportionately-pointed converging cone and an outlet-tap. This cone is covered with a strainer of the same conical shape, and between the strainer and the cone a filter or straining-cloth is inserted, so that a proportionately lofty column of water can press down from above upon the coffee, which is suitably placed in the cone, and an exhaustive infusion of the coffee is thus obtained.

The accompanying drawing is a section of the apparatus.

The cylinder $b$, which is rather lofty and has a comparatively narrow diameter, is fitted at the top with a cover $a$, made as tight as possible, while the lower portion of the cylindrical vessel is fitted with a removable stand $h$ in the shape of a plate or disk. This removable stand $h$, which is easily turned around or removed, is furnished on a projecting edge or flange with two fissures or slots opposite each other. At the lower end of the cylindrical vessel $b$ and corresponding with these two fissures or slots two pins $i$ are introduced, also opposite to each other. If these two pins $i$ are inserted into the perpendicular fissures or slots on the removable stand $h$ and a slight revolution be given to the same, the vessel becomes firmly locked together with the removable stand $h$. This vessel $b$ can then be placed over any other vessel that may be destined for the reception of the coffee when ready.

In the interior of the cylinder $b$ a pointed cone is fitted, which terminates in a tube for the reception of an outlet-tap, finding an exit through a side opening at the lower part of the cylinder. Over the cone $c$ the similarly conical-shaped filter $e$ is laid, and a strainer $f$ is placed over these whose shape is determined by that of the cone $c$, and which is so arranged that a few millimeters of space intervene between the strainer $f$ and the cone $c$. The object of preserving this intervening space is to prevent the filter and the cone from coming too near together in the vessel and thus impeding the proper action of the apparatus. To obviate such a possibility as this, three small projections $k$ are provided in the interior of the cylindrical vessel, and with which the filter and strainer come in contact when they are inserted in the vessel. Inasmuch as three of these projections are sufficient to keep them in their proper places, we must consider these three projections as an important feature in the apparatus. The handle $g$ of the strainer reaches almost up to the cover of the vessel.

The operation of the apparatus is as follows: In order to prepare the coffee, first take out the strainer $f$. Then press the conical-shaped filter $e$ from beneath firmly up against it and shake the coffee-powder into the strainer $f$. Place the strainer in the cylinder so that the filter $e$ comes between the strainer $f$ and the cone $c$. Now pour in a small quantity only of boiling water, so that the coffee is just well covered by it, allow the apparatus to remain some time with the tap $d$ closed, then pour in water sufficient for the quantity of coffee required, put on the cover $a$, and let the coffee stand for another short or long period. Then open the outlet-tap $d$ and allow the coffee to flow into the vessel destined for its reception slowly or quickly, according to the position of the outlet-tap $d$.

The advantages offered by the apparatus are the following: Owing to the shape of the cone $c$ and to the comparatively small diameter of the cylinder the coffee-powder lies in a space which is funnel-shaped and becomes more and more contracted. The water can thus thoroughly permeate the whole of it. By keeping the tap closed the boiling water can operate on the coffee-powder for as long a period as may be desired, and after the tap has been opened the proportionately lofty column of water, owing to its weight, forces out the concentrated solution lying below it, and thus extracts the whole of its virtues.

The apparatus is suitable not only for the preparation of coffee, but is also adapted for making tea.

Having now described my invention, what I claim, and desire to secure by Letters Patent, is—

An apparatus for obtaining infusions of coffee, tea or the like, comprising the vessel $b$ provided with a cover $a$, a conical bottom $c$ provided with the tap $d$, a conical strainer $f$ and a filter $e$ resting on said conical bottom, and the stand $h$ removably connected with said vessel $b$.

In witness whereof I have hereunto signed my name in the presence of two subscribing witnesses.

KARL MEZGER.

Witnesses:
ALVESTO S. HOGUE,
JEAN GRUND.